Nov. 9, 1937.   E. J. GOULD   2,098,645
POWER DRIVE FOR MOTOR VEHICLE AXLES
Filed July 1, 1935   2 Sheets-Sheet 1
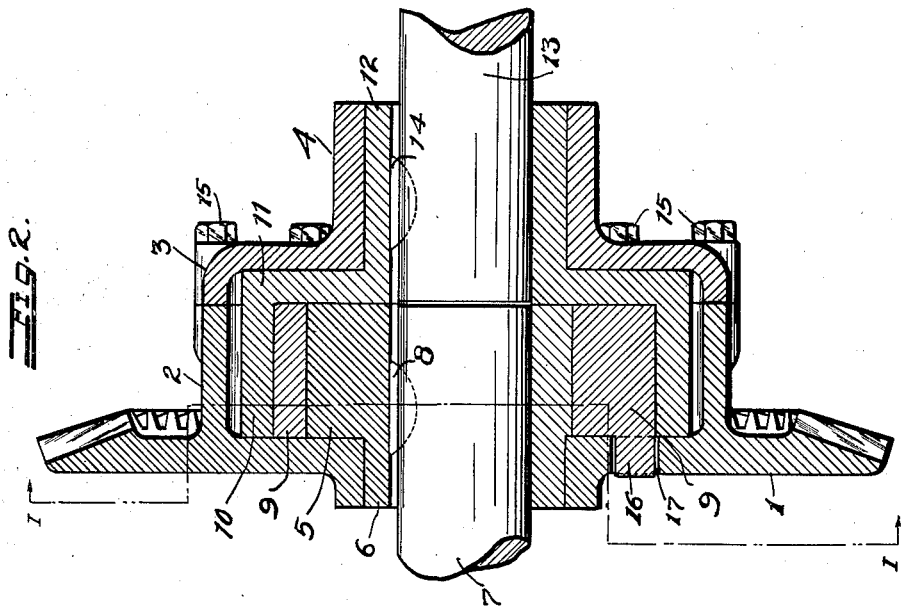
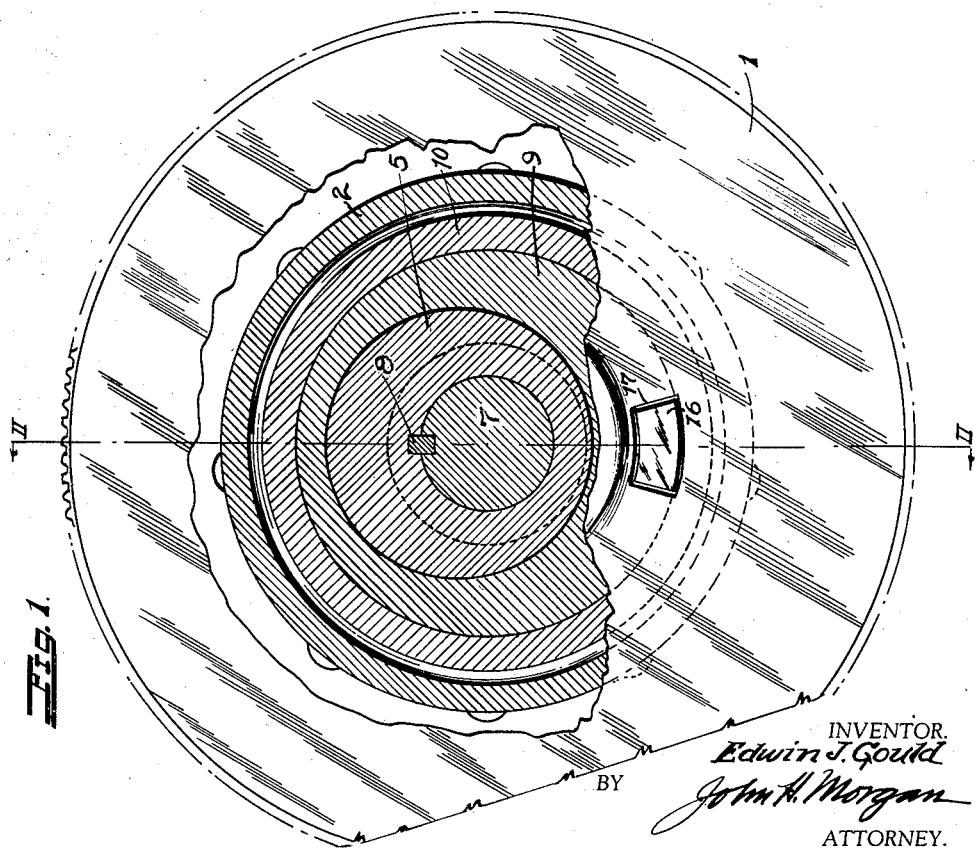
INVENTOR.
Edwin J. Gould
BY John H. Morgan
ATTORNEY.

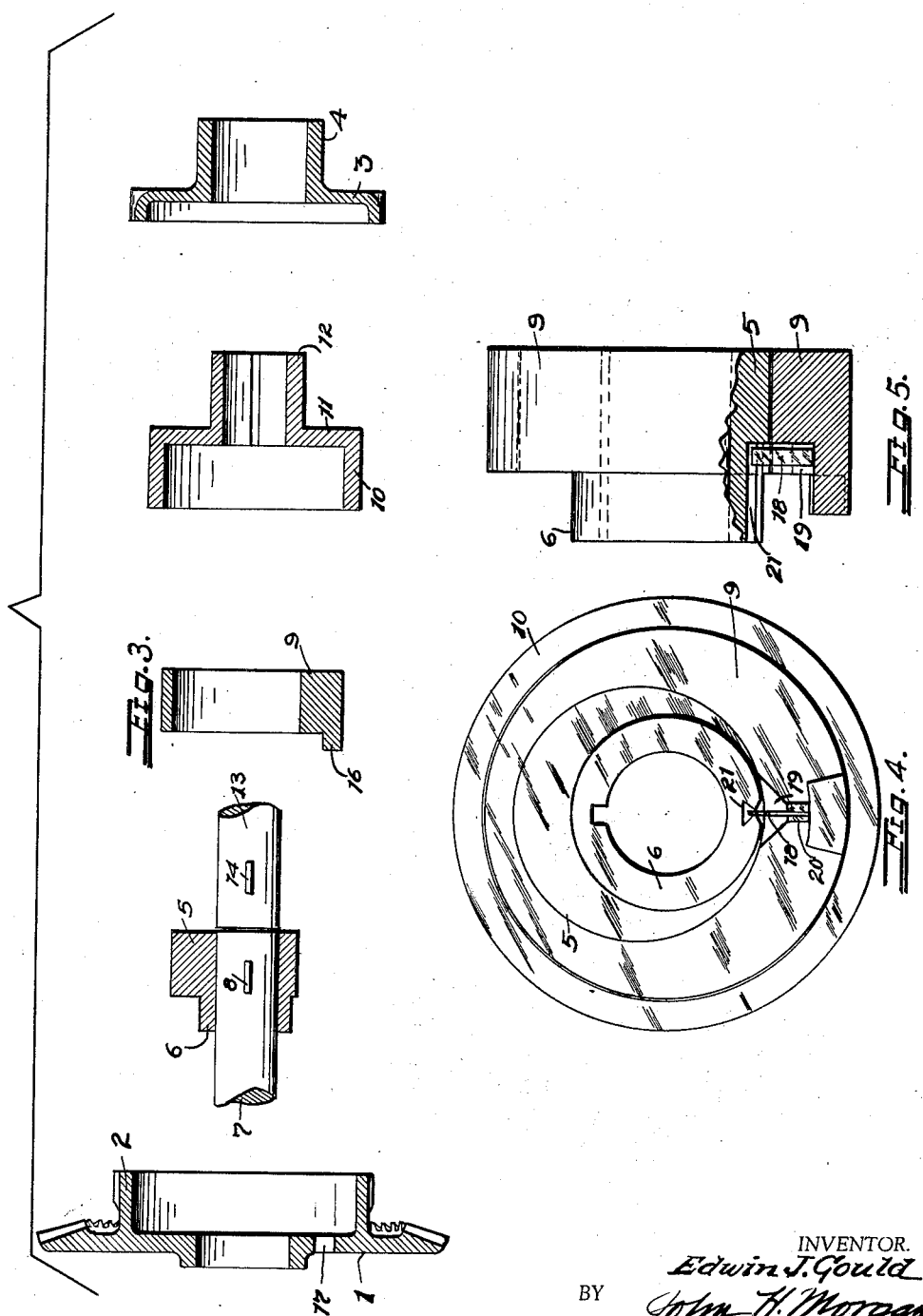

Patented Nov. 9, 1937

2,098,645

UNITED STATES PATENT OFFICE 2,098,645

POWER DRIVE FOR MOTOR VEHICLE AXLES

Edwin J. Gould, Oakland, Calif., assignor to Cora Gould Harvey, Alameda County, Calif.

Application July 1, 1935, Serial No. 29,298

5 Claims. (Cl. 74—389.5)

This invention relates to power drive for motor vehicles and more particularly to a drive for live axles of motor vehicles, and it is designed to take the place of differential gears as now used, the faults of which are well known to engineers and drivers of motor vehicles.

Among the objects of the present invention, one is to provide a simple construction without gears that would be a positive drive under all conditions for the abutting live axles of a motor vehicle.

Another object is to provide a device of this kind of strong and inexpensive construction of few parts.

Another object is to provide a power drive that will give positive and equal driving force on both axles on straight road driving and allow one of the axles to over-run on curves, thus preventing uneven wear on the tires and undue strain on the entire mechanism of the vehicle.

Other objects of my invention will appear to those skilled in this branch of engineering as the description progresses.

An embodiment of the invention is shown in the accompanying drawings in which the same reference numeral is applied to the same portion throughout the several views, and of which there may be modifications.

Figure 1 is a face view broken away to show a section on line 1—1 of Figure 2.

Figure 2 is a section on line 2—2 of Figure 1.

Figure 3 is a sectional view on a smaller scale of the main drive gear and housing drum, a section of the hub and eccentric member showing a portion of the live axle, a sectional view of the wedging eccentric member, also a sectional view of the eccentric drum and hub member, and a sectional view of the outside hub and housing drum.

Figure 4 is a front view of a modified form of the invention.

Figure 5 is an edge view of the modified form, partly in section.

The numeral 1 indicates the main drive gear adapted to be driven by a pinion and shaft, not shown. This main gear may be a worm gear and driven by a worm on a shaft from the power means. Fixed on the main drive gear, is the drum or housing 2, in this instance, it is integral with the gear but it may be bolted on. This drum with the drum 3 and hub 4 forms the housing for the power drive which comprises the eccentric member 5 having the hub 6 fixed on the end of one of the axles 7 by means of the key 8.

Freely mounted on the eccentric is the eccentric wedging member 9, which in turn is mounted freely to turn in the concentric drum 10, which has the flange 11 and the hub 12 and this hub is fixed to the end of the other axle 13 by the key 14.

Bolts 15 are provided for holding the housing drums together.

On the eccentric wedging member 9 there is a lateral projection 16 which projects through an opening 17 in the web of the main gear 1.

In operation, the main drive gear being driven, the wedging action of the member 9 will lock the members 9, 10, and 5 together and through the keys 8 and 14 the axles 7 and 13 will be driven in unison, which in effect is the same as a single axle on a motor vehicle driven on a straight course, but it will be plainly apparent and as has been described, while the live axle has been driven ahead as a unit of one shaft; on turning, one section would need to travel faster, or at a different rate of speed than the other section, therefore, and consequently when turning to the left the wheel attached to shaft 13 would from its ground traction, and the momentum of the vehicle, over-run the driving power, and the eccentric wedging member 9 would be released from the wedging drive of the member for the time being, just sufficient to allow for the difference in travel until the curve is completed.

In turning to the right it is obvious that the wheel attached to the axle 7 will tend to over-run, and while it cannot run faster than the casing or housing, it can, by exerting forward pressure on the member 10 fixed to shaft 14, tend to bring the eccentric action to the neutral point and release the power drive on the wedging member and therefore allow the member 10 to be retarded in relation to the travel of the vehicle, for the same reason that the member was accelerated while turning in the opposite direction.

From the above description taken with the drawings it will be seen that a very simple, strong and effective power drive has been evolved.

In the modified form shown in Figures 4 and 5, a spring 18 is mounted to act between the member 9 and the member 5 to bring the members on to a neutral line, the friction between the members 9 and 5 being sufficient to overcome the action of the spring. The spring in this instance is held in a recess 19 by blocks 20 driven in place. There is a recess 21 in the hub member and member 5.

Having thus described my invention what I wish to secure by Letters Patent of the United States is as follows, but modifications may be had in carrying out the invention as shown in the accompanying drawings and particularly described form thereof within the purview of the annexed claims.

I claim—

1. A power drive for motor vehicles of the class described comprising two axles in alignment with each other, an eccentric member fixed to one of said axles, a wedging eccentric member mounted on said eccentric member, a concentric drum mounted on said eccentric wedging member and being fixed to the other of said axles, a drive member having a drum forming part of an inclosing housing, a drum member forming the other part of the inclosing housing, an opening in the side of the drive member, and a projecting member on said wedging eccentric member adapted to project into said opening.

2. A power drive for motor vehicles of the class described comprising a pair of live axles in alignment, an eccentric fixed on one of said axles, a concentric drum fixed on the other axle, a wedging eccentric member acting between said eccentric and said drum, a housing for said eccentric and drum members, an opening in said housing, a projecting member on said wedging eccentric member adapted to engage said opening, and a drive member fixed to said housing.

3. A power drive for motor vehicles of the class described comprising a pair of live axles in alignment, an eccentric member having a concentric hub fixed to one of said axles, a concentric drum member having a hub fixed to the other axle, an eccentric wedging member between said eccentric member and said concentric drum, a housing member in two parts mounted on said hubs, a drive member fixed to said housing, an opening in said housing and a projecting lug on said eccentric wedging member adapted to engage said opening.

4. A power drive of the class described comprising a motor vehicle having a divided drive axle, an eccentric member having a concentric hub fixed on one member of said axle, a free eccentric wedging member on said eccentric, a concentric drum for said eccentric members, a hub for said drum fixed to the other member of said axle, a housing freely mounted on said hubs, a drive member on said housing, an opening in said housing, a projecting member on said free eccentric wedging member adapted to engage said opening whereby the movement in either direction of the housing will move the wedging member and lock the eccentric and drum members together and thereby drive both members of the axle in a straight course of the vehicle and allow for the release of the locking effect on a curve, when one of the axles overruns the other.

5. A power drive of the class described comprising two axles in alignment, an eccentric member fixed to one of said axles, a wedging eccentric member mounted on said eccentric member, a concentric drum to inclose said eccentric members fixed on the other axle, a housing for said eccentric and drum members, a drive member on said housing, an opening in said housing, a projection on the eccentric wedging member adapted to engage said opening whereby a movement of said housing will move said eccentric members out of the neutral position and cause them to lock together, a spring member acting between the eccentric and wedging member fixed to one of said members to hold them in the neutral position.

EDWIN J. GOULD.